Sept. 24, 1940.　　　W. L. SCHOENGARTH　　　2,216,024
HYDRAULIC TRANSMISSION
Filed June 19, 1939　　　4 Sheets-Sheet 2
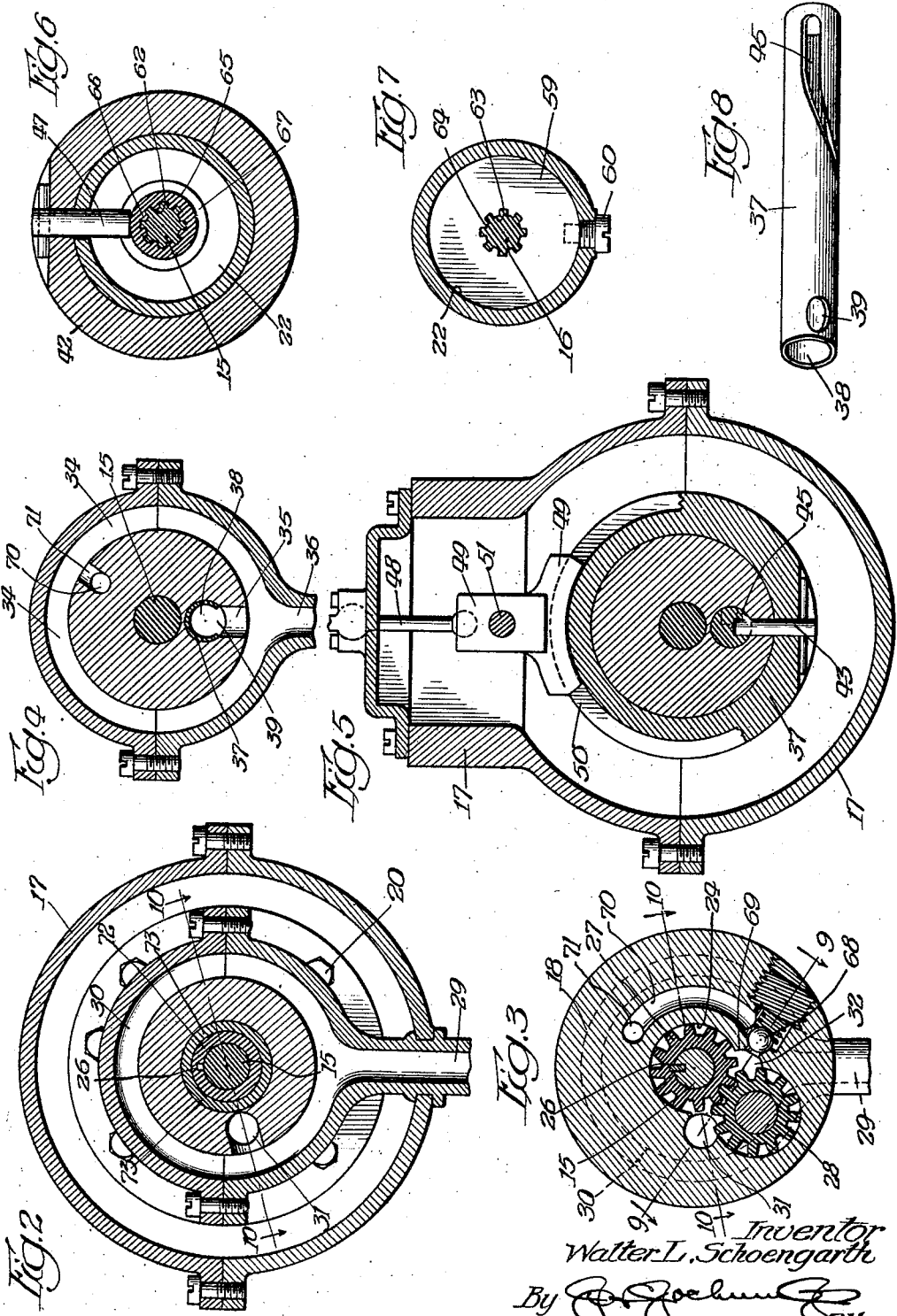
Inventor
Walter L. Schoengarth
By [signature] Atty.

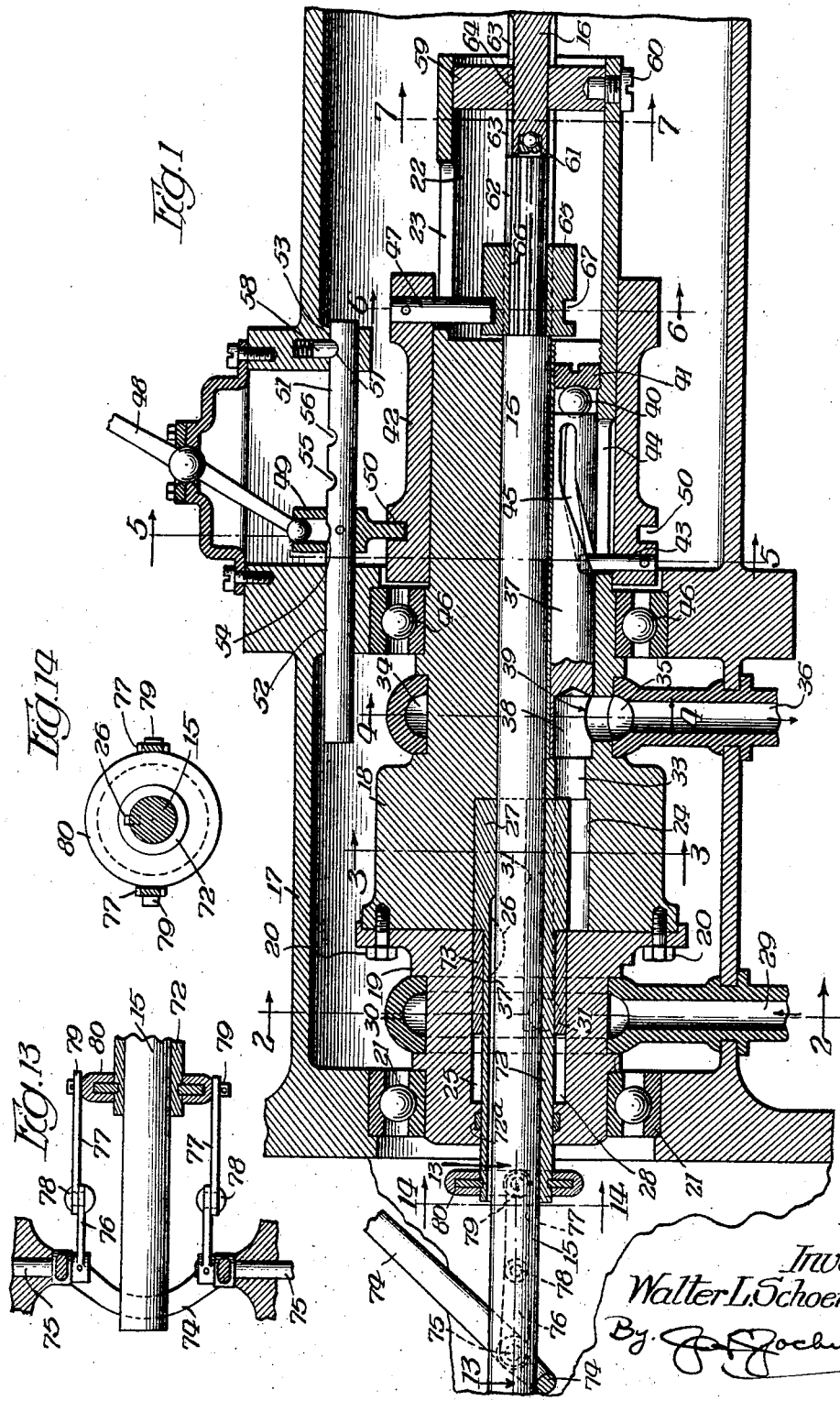

Sept. 24, 1940.  W. L. SCHOENGARTH  2,216,024
HYDRAULIC TRANSMISSION
Filed June 19, 1939  4 Sheets-Sheet 3
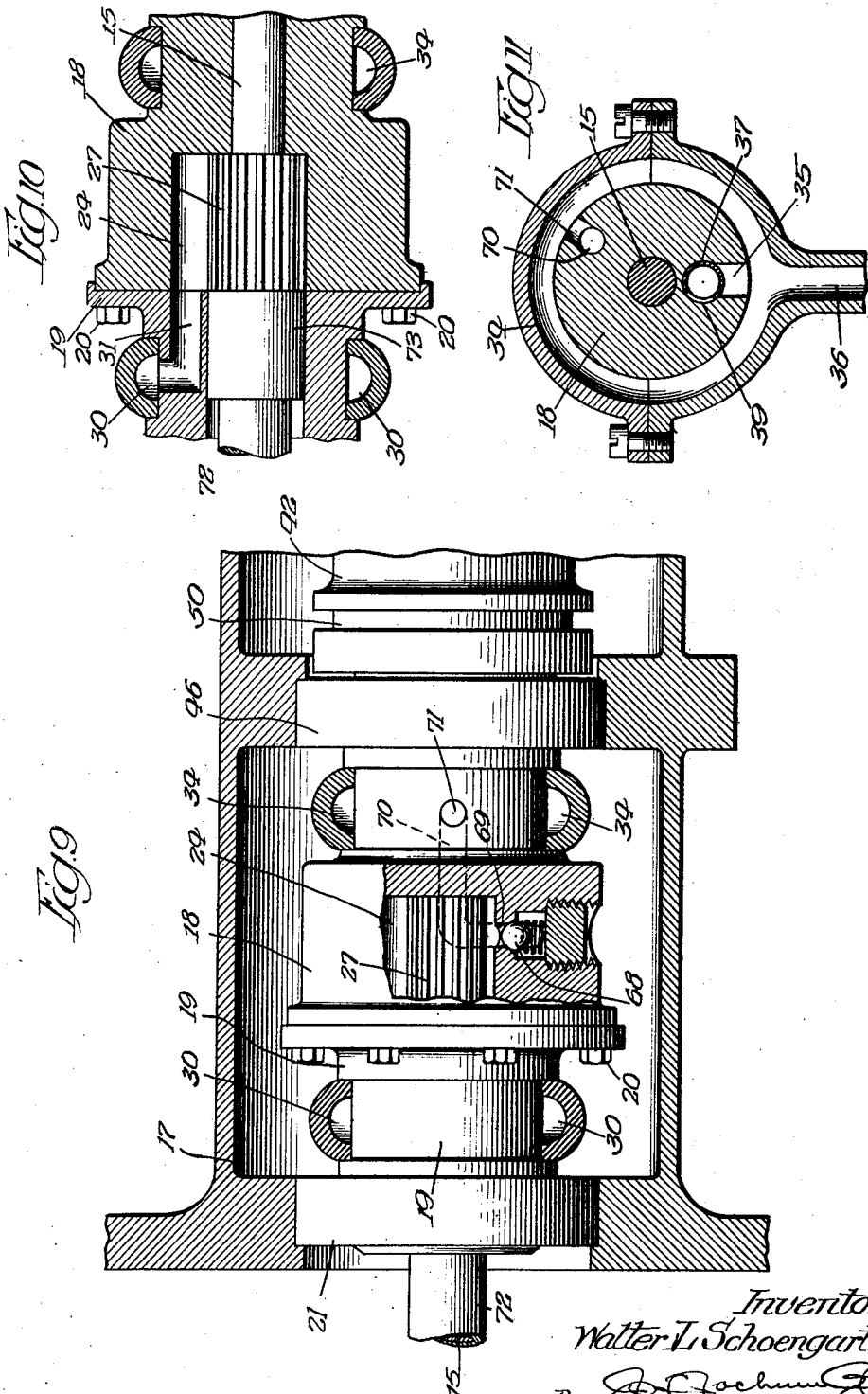
Inventor
Walter L. Schoengarth

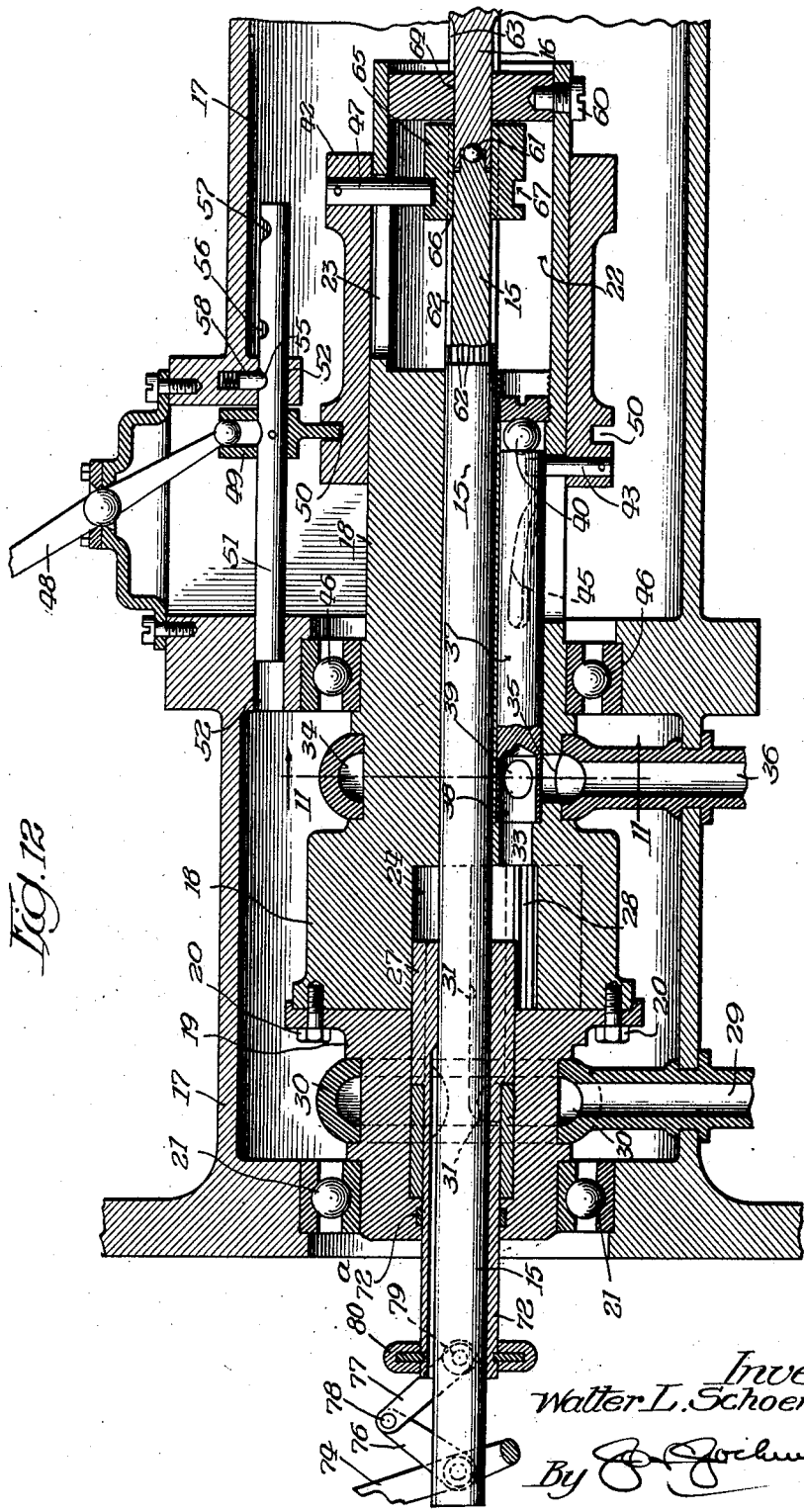

Patented Sept. 24, 1940

2,216,024

UNITED STATES PATENT OFFICE 2,216,024

HYDRAULIC TRANSMISSION

Walter L. Schoengarth, Ironwood, Mich.

Application June 19, 1939, Serial No. 279,789

10 Claims. (Cl. 192—57)

This invention relates to improvements in hydraulic transmission mechanism of the gear pump type, wherein the circulation of fluid, such as oil or the like, may be controlled at will to vary the speed of a driven shaft with respect to the speed of a driving shaft, and one of the objects of the invention is to provide improved means whereby the speed of one shaft may be quickly brought up to the same speed as another shaft without hesitation or interruption during the interval of the shift in the transmission.

A further object is to provide in a device of this character, improved means for automatically relieving the fluid pressure.

A further object is to provide improved transmission of this character which will be of a comparatively simple construction, compact, and effective and efficient in operation.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a longitudinal sectional view, with parts omitted, of a transmission of this character, constructed in accordance with the principles of this invention.

Figure 2 is a detail sectional view taken on line 2—2 Figure 1, with parts omitted.

Figure 3 is a detail sectional view taken on line 3—3 Figure 1, with parts omitted.

Figure 4 is a detail sectional view taken on line 4—4 Figure 1, with parts omitted.

Figure 5 is a detailed sectional view taken on line 5—5 Figure 1, with parts omitted.

Figure 6 is a detail sectional view taken on line 6—6 Figure 1, with parts omitted.

Figure 7 is a detail sectional view taken on line 7—7 Figure 1, with parts omitted.

Figure 8 is a detail perspective view of the control valve.

Figure 9 is a view partly in elevation, partly in section and partly broken away, with parts omitted, and as taken on line 9—9 Figure 3.

Figure 10 is a sectional view taken on line 10—10 Figure 2, and on an enlarged scale on line 10—10 Figures 2 and 3.

Figure 11 is a detail sectional view taken on line 11—11 Figure 12.

Figure 12 is a view similar to Figure 1 showing the parts in a different position.

Figure 13 is a detail sectional view taken on line 13—13 Figure 1.

Figure 14 is a detail sectional view taken on line 14—14 Figure 1.

Referring more particularly too the drawings the numeral 15 designates a driving shaft and 16 a driven shaft.

Portions of the shaft are arranged within a casing 17 and within the casing 17 is a housing formed of sections 18–19 arranged end to end and secured together in any suitable manner such as by means of fastening bolts or screws 20. The section 19 is rotatably supported in a bearing 21 in the casing 17, the bearing being preferably of the ball type, while the section 18 rotatably supports the shaft 15 by a bearing 46.

The section 18 is provided at its free end with a tubular portion 22 and a slot 23 is provided in the wall of the tubular portion, for a purpose to be described.

Within the section 18 and in proximity to the section 19 is arranged a chamber 24 which has communication with a chamber 25 in the section 19. Secured to the shaft 15 for rotation therewith in any suitable manner so that it may be moved longitudinally of the shaft, preferably by means of a key or spline 26 is a gear 27 and also within the chamber 24 and meshing with the gear 27 is another gear 28 which, when the shaft 15 is rotated, will be rotated by the gear 27 to circulate the fluid, such as oil or the like, around the gears.

Fluid is admitted into the chamber 24 from an inlet passage 29 that receives its supply from any suitable source, the passage 29 having communication with a chamber 30 that encompasses the chamber 24, communication being made through a port or opening 31.

Fluid entering the chamber 24 through the opening 31 will, when the gears are being rotated, flow around the gears to a passage 32 to be discharged from the chamber through a port or passage 33, thence into an annular chamber 34, the latter having an outlet 35 which communicates with a discharge passage or pipe 36 that leads back to the source of supply (not shown).

In order to control the speed of rotation of the gears, it is only necessary to control the discharge of the fluid from the chamber 24 and the control of the discharge will control the pressure created by the fluid. This control may be effected in any suitable manner but preferably by means of a valve 37 which is preferably elongated and is rotatable on an axis substantially parallel with the axis of the shaft 15. The valve is mounted in section 18 of the housing and is provided with a tubular portion 38 at one end which communicates with the port or passage 33, and an outlet 39 is provided in the wall of the tubular portion 38.

This outlet 39 is adapted to be brought into communication with the passage 35 and out of communication therewith by the rotation of the valve 37. The rotation of the valve will cause the size of the outlet 39 thereof to be increased or decreased with respect to the passage 35 and the pressure of the fluid in the chamber 24 will be controlled by the speed of discharge of the fluid from the chamber 24 through the outlet 39 of the valve 37 and the passage 35.

Thus it will be seen that by rotating the valve 37 the speed of the transmission will be controlled.

The valve 37 is preferably provided with an end thrust bearing 40 held in position by means of an adjustable nut or member 41.

Mounted to slide upon the section 18 of the housing is a sleeve 42 and secured to the sleeve is a pin 43 which projects through a slot 44 in the section 18 of the housing and enters a slot or groove 45 in the valve 37 a portion of which groove is spiral and another portion of which is straight or parallel with the axis of the valve. When the sleeve 42 is moved upon the section 18 of the housing in a direction lengthwise of the axis of the section, the valve 37 through the medium of the pin 43 moving in the spiral part of the slot 45 will be correspondingly rotated to vary the size of the opening 39 in the valve 37 with respect to the outlet port 35, and when the pin is moving in the straight portion of the slot, the valve will not be rotated.

The section 18 is preferably mounted for rotation in a bearing 46 of the ball type.

The sleeve 42 will rotate with the housing when the latter is rotated by reason of the pin 43 passing through the slot 44 and also through the medium of another pin 47 which extends through the slot 23 in the tubular portion 22 of the section 18.

This pin 47 is provided for a purpose to be hereinafter described.

The sleeve 42 is adapted to be moved longitudinally of the shaft 15 so as to vary the speed of rotation of the driven shaft, preferably by means of a hand operated lever 48 which has connection with a yoke 49 that operates in an annular groove 50 in the sleeve. This yoke 49 is supported by a rod 51 to which it is secured and which rod is slidable in bearings 52—53 in the casing 17. The rod 51 is provided with a series of notches or seats 54—55—56—57 which seats are adapted to be selectively positioned with respect to a spring pressed pin or member 58 for determining the position of the sleeve 42 as well as the valve 37.

By operating the lever 48 the spring pressed locking element 58 will yield to permit the sleeve 42 and the rod 51 to be moved and when one of the recesses or notches is in alinement with the element 58 the latter will enter the recess and yieldingly lock or hold these parts in their adjusted position.

Motion is imparted to the driven shaft 16 from the housing 18—19 through the medium of the tubular portion 22 of the section 18 and to that end there is provided a member 59 disposed within the tubular portion and secured to such portion for rotation therewith by means of a suitable anchoring or securing element 60, such as a screw or the like.

The end of the shaft 16 is in abutting relation with the proximate end of the shaft 15 preferably with a thrust bearing 61, preferably in the form of a ball therebetween.

The proximate ends of the shafts 15—16 are respectively provided with grooves or channels 62—63 (see particularly Figures 6 and 7). The grooved portion 63 of the shaft 16 passes through the member 59 (see particularly Figure 7) which latter is provided with spaced projections 64 that enter the grooves 63 in the shaft.

Slidably mounted upon the grooved extremity 62 of the shaft 15 is a collar 65 which is provided with spaced projections 66 that enter the grooves 62 and this collar is adapted under predetermined conditions to be positioned so as to overlap the proximate ends of the shafts 15 and 16 to lock these shafts together, when the parts are in the position shown in Figure 12.

The collar 65 is moved longitudinally of the shafts upon the operation of the hand lever 48, through the medium of the sleeve 42 and the pin 47 which passes through the slot 23 in the tubular portion 22 of the section 18 of the housing. This pin 47 enters a peripheral groove 67 in the collar 65 and the collar may be moved to the position shown in Figure 12 and held in this position when the notch 55 is in a position to receive the spring pressed element 58.

It will therefore be seen that when the shaft 15 is being rotated the gears 27—28 will also be rotated and this will cause the fluid to be circulated into the chamber 24 through the opening 31, around the gears 27—28, thence from the chamber 24 through the passage 33, into the open tubular end 38 of the valve 37, through the outlet port 39 of the valve, through the port 35, and thence through the passage 36 and back to the source of supply.

By actuating the hand lever 48 and by rotating the valve 37 to change the position of the port 39 with respect to the port 35 the discharge of the fluid from the chamber 24 will be accelerated or retarded and this will control the speed of rotation of the shaft 16 with respect to the shaft 15.

When the valve 37 is moved to the position shown in Figure 12 so that the port 39 is entirely moved out of communication with the outlet opening 35 so as to prevent the discharge of the fluid through the outlet passage 36, the housing 18—19 will be locked for rotation with the shaft 15 by reason of the pressure built up in the chamber 24.

At this same time the collar 65 will be positioned to form a mechanical lock between the shafts 15—16, as shown in Figure 12.

In order to eliminate interruption of the power exerted to drive the driven shaft 16, should the operating lever 48 be accidentally forced to a position that the notch or recess 56 would be in a position to receive the locking element 58, at which time the flow of the fluid would cease flowing through the outlet passage or port 39 in the valve, the pressure in the chamber 24 would be built up to a high degree. In order to relieve such excess pressure there may be provided a relief valve preferably in the form of a spring pressed ball 68 (see particularly Figures 3, 4 and 9) which controls an escape passage 69 that has communication with a passage 70, the outlet 71 of which latter has communication with the chamber 34 that has communication with the discharge passage 36.

With this improved construction and when the pressure is built up sufficiently in the chamber 24, the valve 68 will be unseated and the fluid will be permitted to flow through the passages 69—70—71 into the chamber 34 and thence through the passage or pipe 36.

In the operation of this mechanism, when the shaft 15 is rotated, the fluid being forced between the gears will result in a constant drag on the mechanism.

In order to overcome this objection, the gear 27 is adapted to be moved laterally with respect to the gear 28 and lengthwise of the axis of the shaft 15 by reason of the spline connection 26 shown clearly in Figure 1.

To that end the hub of the gear 27 is reduced, as at 72, to form a sleeve which passes through the chamber 25 in the section 19 of the housing, and this sleeve is of an external diameter somewhat less than the diameter of the chamber 25 so as to accommodate a bearing sleeve 73 which encompasses the sleeve 72. This sleeve 73 is of a length somewhat less than the length of the chamber 25 and serves as a means for limiting the lateral movement of the gear 27.

This gear 27 is adapted to be partially removed from the chamber 24 with the result that a churning effect only of the fluid will be created in the chamber 24. This acts in turn as a by-pass, releasing the flow of the fluid, relieving the drag on the mechanism, and obviates the necessity of the use of an additional clutch or similar device.

The shifting of the gear 27 may be accomplished by means of a lever 74 which is pivotally supported, as at 75, and connected to the lever are arms 76. Links 77 are respectively pivotally connected by one end, as at 78, to the arm 76 and the other ends of the links are pivotally connected, as at 79, to a yoke or collar 80 which in turn is fastened to the sleeve 72.

It will therefore be manifest that by rocking the lever 74 about its pivot 75 the arms 76 and links 77, which constitute a toggle mechanism, will be operated to slide the sleeve 72 upon the shaft 15 and the gear 27 laterally either into or out of the chamber 24 according to the direction of movement of the lever 74. The gear 27 is not entirely removed from the chamber 24 and the extent of such removal will be controlled by the length of the bearing 73 as one end of the bearing will abut the end of the chamber 25.

With this construction the power may be imparted from the driving shaft 15 to the driven shaft 16 by actuating the lever 48, to move the parts to the position shown in Figure 12. This in turn will move the sliding yoke or rod 51 to position the notch 55 with respect to the spring locking element 58, at the same time leaving the discharge port 39 in the valve 37 closed, locking the shaft 15 and 16 for rotation together. When, however, the splined sleeve 65 is drawn from its locked position with respect to the driven shaft 16, that is from the position shown in Figure 12, on to the shaft 15 or into the position shown in Figure 1, the shafts 15—16 will be free with respect to each other and both will be controlled by hydraulic action.

When the sliding rod 51 is actuated to force locking element 58 from the notch 57 (Figure 1) and moved to the extent that the notch 56 will be in a position to receive the spring locking element 58, the port 39 in the valve 37 rotates a complete distance from opened to closed position, and when the parts are in the position as shown in Fig. 1, the lever 48 will be in an intermediate position. At this time, the hydraulic action will be brought up to the same speed as the shaft 15.

Should it be desired to lock the shaft 15—16 by the collar 65, as shown in Figure 12, the lever 48 may be forced into the position shown in Figure 12, that is, so that the rod 51 will be moved to position the notch 55 so as to receive the spring locking element 58.

At this time the slot 45 in the valve 37 will be so positioned that the pin 43 will move in the straight part or portion of the slot that is parallel with the axis of the valve. Therefore the valve 37 will not be rotated while the pin is moving in this straight portion of the slot.

When the spring locking element 58 is seated in the notch 56 of the rod 51, the collar 65 will be out of engagement with the shaft 16 and the lock will be at freedom with respect to the hydraulic control.

By moving the lever 74 back to the position shown in Figure 1, that is, so that the gear 27 will be positioned back into the chamber 24, the gear 27 forces the fluid into the discharge chamber 34. The port 39 being closed, a blocking resistance will be created upon the fluid thereby causing the housing composed of the sections 18—19 to rotate the driven shaft 16, the said impeller shaft being integral with the section 18 through the medium of the member 59.

It is thought that the operation of this mechanism will be clearly understood from the foregoing, but briefly stated it is as follows: When the parts are in the position shown in Figure 1, the discharge opening 39 in the valve 37 will be in register with the discharge outlet 35 of the chamber 34 and the driven shaft 16 will be locked to the housing 18—19 through the medium of the member 59.

The rotation of the shaft 15 rotates the gear 27 and this in turn rotates the gear 28 causing the fluid which flows into the chamber 24 to be circulated about the gears, thence through the passage 33 through the valve 37 through the outlet port 39 and thence through the discharge chamber 34 out of the passage 36.

By shifting the lever 48 to move the sleeve 42 upon the section 18, the valve 37 will be correspondingly rotated and this will vary the size of the outlet port 39 of the valve with respect to the outlet port 35 of the chamber 34, with the result that the speed of operation of the shaft 16 with respect to the shaft 15 will be correspondingly varied. However, when the outlet port 39 of the valve 37 is entirely closed, pressure will be built up in the chamber 24 and this will lock the housing 18—19 for rotation with the shaft 15.

The housing 18—19 is adapted to be maintained against rotation by moving the port 39 in the valve 37 into register with the port 35, as shown in Figure 1. This allows liquid to flow through the passage 29, chamber 30 and opening 31, through and around the gears 27—28, thence to chamber 24, to the ports 39, 35 and passage 36 into the reservoir. To relieve the flow of the liquid through these passages, etc., the gear 27 is drawn from the chamber as shown in Figure 12 by moving the lever 74 to the position shown in Figure 12. This is turn allows the liquid to be "churned" in the chamber from which the gear 27 has been drawn. This will stop the flow of liquid which will in turn relieve all drag on the housings 18—19 and the shaft 15.

The sleeve 65 will also serve as an additional means for mechanically locking the shafts 15—16 together. When the pressure in the chamber 24 becomes excessive the relief valve 68 will yield to allow the fluid to escape through the passages 70—71 into the discharge or outlet chamber 34.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. In an hydraulic transmission, a driving shaft, a driven shaft in alinement therewith, a housing encompassing and rotatably supported independently of the driving shaft, a chamber in the housing, a pair of meshing pinions arranged for operation within the chamber, one of said pinions being secured to the driving shaft, said chamber having a liquid inlet opening and a liquid discharge outlet opening, a connection between said housing and said driven shaft, a second casing in the housing and into which the ends of the driving and driven shafts extend, a sleeve within the last said chamber and slidable upon the proximate ends of said shafts and spanning the extremities of the shafts for mechanically locking the shafts together, valve mechanism for controlling the discharge of the liquid from said chamber, whereby the speed of rotation of said housing with respect to the speed of rotation of the driving shaft may be varied, and means for actuating at will the said valve.

2. In an hydraulic transmission, a driving shaft, a driven shaft in alinement therewith, a housing encompassing and rotatably supported independently of the driving shaft, a chamber in the housing, a pair of meshing pinions arranged for operation within the chamber, one of said pinions being secured to the driving shaft, said chamber having a liquid inlet opening and a liquid discharge outlet opening, a connection between said housing and said driven shaft, valve mechanism for controlling the discharge of the liquid from said chamber, whereby the speed of rotation of the housing with respect to the speed of rotation of the driving shaft may be varied, means for actuating at will the said valve, a second chamber in said housing, mechanical means within said second chamber for also locking the driving and driven shafts for rotation together, and means for operating the said mechanical means.

3. In an hydraulic transmission, a driving shaft, a driven shaft in alinement therewith, a housing encompassing and rotatably supported independently of the driving shaft, a chamber in the housing, a pair of meshing pinions arranged for operation within the chamber, one of said pinions being secured to the driving shaft, said chamber having a liquid inlet opening and a liquid discharge outlet opening, a connection between said housing and said driven shaft, a rotatable valve for controlling the discharge of the liquid from said chamber, whereby the speed of rotation of said housing with respect to the speed of rotation of the driving shaft may be varied, said valve being rotatable on an axis parallel with the axis of the driving shaft, a sleeve slidably carried by said housing, a connection between the sleeve and said valve, mechanical means embodying a slidable element for also locking the driving and driven shafts together, and means common to the said valve and the said slidable element means for simultaneously shifting them.

4. In an hydraulic transmission, a driving shaft, a driven shaft in alinement therewith, a housing encompassing and rotatably supported independently of the driving shaft, a chamber in the housing, a pair of meshing pinions arranged for operation within the chamber, one of said pinions being secured to the driving shaft, said chamber having a liquid inlet opening and a liquid discharge outlet opening, a connection between said housing and said driven shaft, a rotatable valve for controlling the discharge of the liquid from said chamber, whereby the speed of rotation of said housing with respect to the speed of rotation of the driving shaft may be varied, said valve being rotatable on an axis parallel with the axis of the driving shaft, means embodying a slidable sleeve for locking the driving and driven shafts together, and yielding locking means for maintaining said valve in the different positions into which it may be rotated.

5. In an hydraulic transmission, a driving shaft, a driven shaft in alinement therewith, a housing encompassing and rotatably supported independently of the driving shaft, a chamber in the housing, a pair of meshing pinions arranged for operation within the chamber, one of said pinions being secured to the driving shaft, said chamber having a liquid inlet opening and a liquid dscharge outlet opening, a connection between said housing and said driven shaft, valve mechanism for controlling the discharge of the liquid from said chamber, whereby the speed of rotation of said housing with respect to the speed of rotation of the driving shaft may be varied, a sleeve slidable upon one of the shafts and over the proximate ends of the shafts for locking the shafts together, and means common to the valve and the said sleeve for simultaneously operating them.

6. In an hydraulic transmission, a driving shaft, a driven shaft in alinement therewith, a housing encompassing and rotatably supported independently of the driving shaft, a chamber in the housing, a pair of meshing pinions arranged for operation within the chamber, one of said pinions being secured to the driving shaft, said chamber having a liquid inlet opening and a liquid discharge outlet opening, a connection between said housing and said driven shaft, valve mechanism for controlling the discharge of the liquid from said chamber, whereby the speed of rotation of said housing with respect to the speed of rotation of the driving shaft may be varied, means for controlling said valve, means adapting one of said pinions for lateral shifting movement with respect to the other of said pinion, and means for thus shifting the laterally shiftable pinion.

7. In an hydraulic transmission, a driving shaft, a driven shaft in alinment therewith, a housing encompassing and rotatably supported independently of said driven shaft, a chamber in the housing, a pair of meshing pinions arranged for rotation in said chamber, one of pinions being secured to the driving shaft for rotation therewith and for lateral shifting movement upon and in directions lengthwise of the shaft, means for thus laterally shifting said pinion, said chamber having a fluid inlet and a fluid outlet, valve mechanism for controlling said outlet, whereby the speed of rotation of the driven shaft with respect to the driving shaft may be varied, and means for controlling said valve.

8. In an hydraulic transmission, a driving shaft, a driven shaft in alinement therewith, a housing encompassing and rotatably supported independently of said driven shaft, a chamber in the housing, a pair of meshing pinions arranged for rotation in said chamber, one of pinions being secured to the driving shaft for rotation therewith and for lateral shifting movement upon and in directions lengthwise of the shaft, means for thus laterally shifting said pinion, said chamber having a fluid inlet and a fluid outlet, valve mechanism for controlling said outlet, whereby the speed of rotation of the driven shaft with respect to the driving shaft may be varied, mechanical means for locking the shafts together, and means common to the said valve and the said mechanical locking means for controlling them.

9. In an hydraulic transmission, a driving shaft, a driven shaft in alinement therewith, a housing encompassing and rotatably supported independently of said driven shaft, a chamber in the housing, a pair of meshing pinions arranged for rotation in said chamber, one of pinions being secured to the driving shaft for rotation therewith and for lateral shifting movement upon and in directions lengthwise of the shaft, means for thus laterally shifting said pinion, said chamber having a fluid inlet and a fluid outlet, valve mechanism for controlling said outlet, whereby the speed of rotation of the driven shaft with respect to the driving shaft may be varied, means for controlling said valve, a by-pass for the liquid from said chamber, and a relief valve for controlling said by-pass, said relief valve being operable under excessive fluid pressure in said chamber.

10. An hydraulic transmission embodying a driving and a driven shaft, a housing rotatably supported independently of the driving shaft, a pair of meshing pinions arranged and operating within the housing, one of the pinions being operatively connected with the driving shaft, said chamber having a liquid inlet and a liquid discharge outlet, an operative connection between the housing and the driven shaft, valve mechanism for controlling said discharge outlet, means for actuating the valve, one of said pinions being laterally shiftable with respect to the other, and means for thus laterally shifting the laterally shiftable pinion.

WALTER L. SCHOENGARTH.